United States Patent
Sturgeon

[15] 3,704,042
[45] Nov. 28, 1972

[54] BRAKE CONTROLLER
[72] Inventor: Edward G. Sturgeon, Orchard Lake, Mich.
[73] Assignee: Syncro Corporation, Oxford, Mich.
[22] Filed: March 2, 1970
[21] Appl. No.: 15,773

[52] U.S. Cl. ............... 303/3, 188/106 P, 303/15, 303/20, 338/39, 338/90
[51] Int. Cl. ............................................. B60t 13/70
[58] Field of Search ....... 188/3, 156, 106 P; 303/3, 7, 303/13–15, 20; 338/96, 38, 36, 39

[56] References Cited
UNITED STATES PATENTS

| | | |
|---|---|---|
| 2,829,225 | 4/1958 | Ross..........................338/39 |
| 3,507,541 | 4/1970 | Ayers........................303/3 X |
| 3,524,159 | 8/1970 | Kilbourn..................338/39 X |
| 3,135,358 | 6/1964 | Greentree....................188/3 |
| 2,898,566 | 8/1959 | Bacca.........................338/39 |

Primary Examiner—Milton Buchler
Assistant Examiner—John J. McLaughlin
Attorney—Harness, Dickey & Pierce

[57] ABSTRACT

A brake controller for an electric brake which is operated by a hydraulic piston from hydraulic fluid from the main brake system and in which the volume of fluid used from the main system to fully actuate the controller is minimized and is at a volume no greater than around .010 cu. in.

6 Claims, 3 Drawing Figures

PATENTED NOV 28 1972
3,704,042
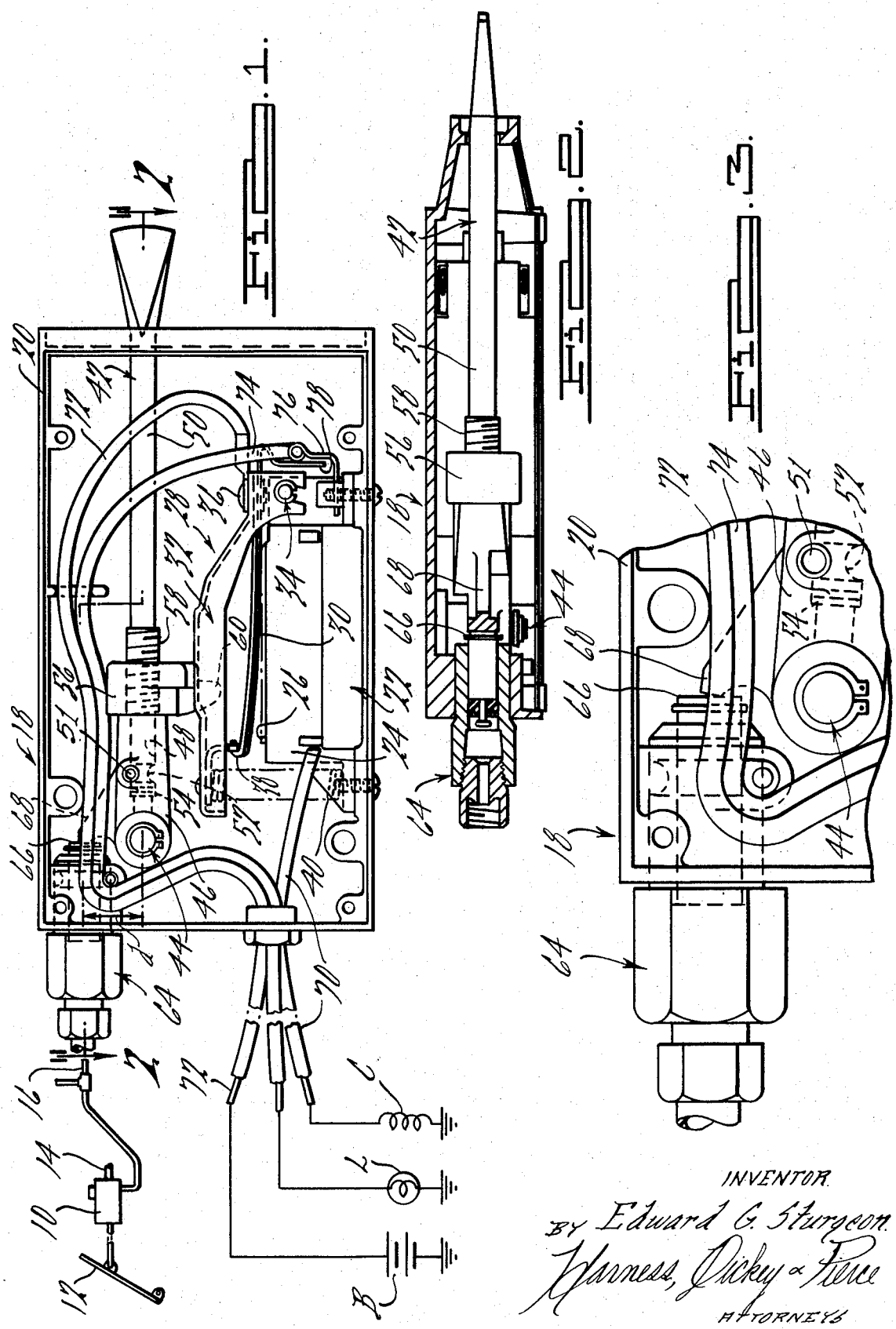
INVENTOR
Edward G. Sturgeon
BY Harness, Dickey & Pierce
ATTORNEYS

BRAKE CONTROLLER

SUMMARY — BACKGROUND OF THE INVENTION

The present invention relates to hydraulically actuated brake controllers for electric brakes. Prior hydraulically actuated brake controllers, while effective in operation, required the use of a substantial volume of fluid from the main brake system. In the event of fading of the main brakes or loss of fluid this volume of fluid taken from the main brake system could result in additional impairment of braking. In the present invention, the volume of fluid required has been minimized, thereby minimizing any impairment of braking as the result of fade, etc. Therefore it is an object of the present invention to provide an improved hydraulically actuated brake controller in which the volume of fluid required from the main brake system is a minimum. It is another object of the present invention to provide an improved hydraulically actuated brake controller for electric brakes.

Other objects, features, and advantages of the present invention will become apparent from the subsequent description and the appended claims, taken in conjunction with the accompanying drawings, in which:

FIG. 1 is a partial schematic diagram including a front elevational view of the brake controller embodying features of the present invention, FIG. 2 is a sectional view taken generally along the line 2—2 in FIG. 1, and FIG. 3 is a blown up fragmentary view of that portion of the device of FIG. 1 enclosed by the dot-dashed lines indicated by the number 3.

Looking now to the drawings, a conventional master cylinder 10 is shown to be actuated by a foot pedal 12 with the master cylinder 10 including at least one brake line 14 for the main brakes of a towing vehicle. A fluid line 16 is connected from the master cylinder 10 to a brake controller 18 for controlling the electric brakes of a trailer. The controller 18 includes a housing 20 in which is supported a resistor assembly 22. The assembly 22 includes a cylindrical core 24 on which is wound a plurality of turns of resistance wire 26. A contactor assembly 28 is mounted at one end of the assembly 22 and has a resilient contact member 30 supported on an arm 32 for selective engagement with the turns of the wire 26. The arm 32 is pivotally supported to assembly 22 by a pin and retainer washer assembly 34. The opening in the arm 32 receiving the pin is slotted to permit a combination of pivotal and translational movement whereby the resilient contact 30 as it contacts the wire 26 will tend to slide thereover to assure good contact. The contact 30 is comprised of a strip of material of a good conductor for electricity which is fixed at one end 36 to the arm 32 via a tongue and groove connection 38; the connection 38 permits movement of the outer end of contact 30 and further improves its ability to contact the wire 26. The arm 32 is bowed outwardly from its pivot end and is resiliently biased to a position away from resistor assembly 22 by a coil spring 40 located between the free end of the arm 32 and a portion of the core 24.

An actuating lever arm assembly 42 is pivotally supported to the housing 20 via a pivot pin and retaining washer assembly 44 located near the free end of the arm 32. The assembly 42 includes a support member 46, which is pivotally supported at one end via assembly 44, and which has a bore 48 opening at its opposite end. One end of an elongated lever 50 is rotatably supported in the bore 48 via a cross pin 50 extending partially through the bore 48 and engaging a groove 52 in the lever 50. A spring 54 biases the lever 50 to firmly engage the pin 50. The lever 50 extends outwardly beyond the housing 20 such that it can be gripped. A cam member 56 is threadably supported on a threaded portion 58 on the lever 50 such that as the lever 50 is rotated the position of cam member 56 along the lever 50 can be selectively varied. The cam member 56 has a projection 60 which is located in a slot 62 formed in the arm 32. Thus the lever 50 can be rotated without rotating cam 56. By changing the position of the cam 56 along the lever 50 the distance from pivot 44 will be varied thereby varying the force required on the lever assembly 42 to overcome the spring 40. The lever assembly 42 can be moved by hand or will be moved by a piston assembly 64 in response to fluid pressure at line 16. The assembly 64 has a piston 66 which engages an arm portion 68 extending substantially transversely relative to the pivot 44 and relative to the line of action of piston 66. The transverse length "d" of arm portion 68 is selected such that the lever assembly 42 can be pivoted to move the contact arm 30 completely across the resistance wire 26 with only a small displacement of piston 66; this then permits a full range of actuation with only a small volume of hydraulic fluid required. With the apparatus as shown the amount of fluid displacement required is approximately no more than 0.010 cubic inches. By locating the piston 66 to engage the arm portion 68 near the pivot axis of lever assembly 42, the bias of spring 40 can be minimized and hence a lighter spring used.

In FIG. 1, a brake coil C for an electric brake is shown with one side grounded and the other side connected to the end of the resistance winding 26 via conductor 70. The contact arm 30 is connected to one end of battery B via a conductor 72, with the other end of battery B connected to ground. In operation, as the lever assembly 42 is pivoted to move the assembly 32 towards the resistor assembly 22, the contact 30 will engage the last turn of the winding 26 thereby closing a circuit to the brake coil C. However, at this time maximum resistance will be in series with coil C via the winding 26. With further pivotal movement of lever assembly 42 more turns will be contacted and less resistance will be in series circuit with coil C resulting in more current. In this way the magnitude of the current to coil C can be varied, and hence braking effect, to correspond to the pivotal movement of lever assembly 42 and hence to correspond to the applied brake pressure in the main brake system as reflected by the pressure in line 16.

A conductor 72 is connected to trailer brake lights L, which have one side grounded, and have the other side connected to a fixed, flexible contact 76 which is secured to the end of core 24. A second flexible contact member 78 is connected to contactor 30. Normally contacts 76 and 78 are disengaged; however, as the assembly 32 is initially pivoted, the contacts 76 and 78 are moved into engagement to close the circuit to the trailer brake lights L so that their lighting coincides with the application of the trailer brakes.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a wheeled vehicle having a hydraulically actuated brake system and having a separate electrically actuated brake system with the hydraulically actuated brakes being actuated via fluid from a master cylinder and with the electrically actuated brakes being actuated via current to an electric brake coil, the improvement comprising: an electric brake controller for controlling the current to the electric brake coil and hydraulically actuated in response to fluid pressure from the hydraulically actuated brake system, said controller comprising an elongated electrical resistance element, contact arm means pivotally supported for movement towards said resistance element and including a contact member electrically engageable at different positions along said resistance element whereby the magnitude of current to the brake coil can be modulated from a condition of low current to a fully actuated high current condition as said contact arm means pivots relative to said resistance element, actuating means operatively connected to the hydraulic system and with said contact arm means and actuable for pivoting said contact arm means, said actuating means comprising a hydraulic piston connected to the hydraulic system and actuated by fluid from the master cylinder and actuable in response to fluid actuation of said hydraulic piston for providing for actuation of said contact arm means from said low current condition to said high current condition with no more than around .010 cu. in. of fluid to said hydraulic piston from the master cylinder, said actuating means comprising a lever arm pivotally mounted about a pivot axis for movement relative to said contact arm means, said lever arm including an actuating portion engageable with said contact arm means at a determinable location to pivot said contact arm means as said lever arm is pivoted about said pivot axis, said lever arm further including an arm portion located proximate to said pivot axis of said lever arm and being engageable by said hydraulic piston at a position substantially closer to said pivot axis than said determinable location whereby actuation of said piston will pivot said lever arm.

2. In a wheeled vehicle having a hydraulically actuated brake system and having a separate electrically actuated brake system with the hydraulically actuated brakes being actuated via fluid from a master cylinder and with the electrically actuated brakes being actuated via current to an electric brake coil, the improvement comprising: an electric brake controller for controlling current to an electric brake coil and being hydraulically actuated in response to fluid pressure from the hydraulically actuated brake system, said controller comprising an elongated electrical resistance element, contact arm means actuably supported for movement towards said resistance element and including a contact member electrically engageable at different positions along said resistance element whereby the magnitude of current to the brake coil can be modulated from a condition of low current to a fully actuated high current condition as said contact arm means is actuated, actuating means operatively connected to the hydraulic system and with said contact arm means and operable for actuating said contact arm means, said actuating means comprising a lever arm, pivot means supporting said lever arm for pivotal movement about a preselected axis, a contact block supported on said lever arm and engageable with said contact arm means whereby said lever arm can actuate said contact arm means as said lever arm is pivoted about said axis, said actuating means further comprising hydraulic piston connected to the hydraulic system and actuated by fluid from the master cylinder and supported to engage said lever arm at a preselected location, said preselected location being closer to said preselected axis than said contact block whereby sad contact arm means can be actuated from said low current condition to said high current condition with no more than around .010 cu. in. of fluid to said hydraulic piston from the master cylinder.

3. The controller of claim 2 with said lever arm including an elongated rod and arm portion extending transversely to said rod with said piston engaging said arm portion for actuating said lever arm.

4. In a wheeled vehicle having a hydraulically actuated brake system and having a separate electrically actuated brake system with the hydraulically actuated brakes being actuated via fluid from a master cylinder and with the electrically actuated brakes being actuated via current to an electric brake coil, the improvement comprising: an electric brake controller for controlling the current to the electric brake coil and hydraulically actuated in response to fluid pressure from the hydraulically actuated brake system, said controller comprising: an elongated electrical resistance element, actuating arm means supported for movement towards said resistance element and including a contact member electrically engageable at different positions along said resistance element whereby the magnitude of current to the brake coil can be modulated from a condition of low current to a fully actuated high current condition as said contact arm means moves relative to said resistance element, hydraulic actuating means operatively connected to the hydraulic system and with said actuating arm means and comprising a hydraulic piston connected to the hydraulic system and actuated by fluid from the master cylinder and actuable in response to fluid actuation OF said hydraulic piston for providing for actuation of said contact arm means from said low current condition to said high current condition, said actuating arm means comprising a lever arm portion pivotally mounted about a pivot axis and actuable for moving said contact member, said lever arm portion including a reaction portion, resilient means operably connected with said reaction portion at a determinable location to normally urge said actuating means in a direction moving said contact member out of electrical engagement with said resistance element, said lever arm portion having an engaging arm portion engageable by said hydraulic piston and located proximate to said pivot axis of said lever arm at a position substantially closer to said pivot axis than said determinable location whereby actuation of said piston will pivot said lever arm with a minimal volume of fluid to said hydraulic piston from the master cylinder.

5. The controller of claim 4 with said electric brake controller including a housing assembly having at least four sides, said pivot axis located proximate one of said sides, said actuating arm means comprising a manual arm portion extending outwardly through an opposite of said sides of said housing assembly for permitting manual actuation for said brake controller, said hydraulic piston connected to said one of said sides of said housing assembly proximate to said pivot axis whereby said hydraulic piston can actuate said actuating arm means proximate its pivotal support and whereby a compact controller can be provided.

6. The controller of claim 4 with said contact arm means including a spring for normally biasing said contact arm means to urge said contact member away from said resistance element; said hydraulic piston supported to engage said arm portion proximate to said pivot axis whereby the bias of said spring can be minimized.

* * * * *